(12) United States Patent
Palanisamy et al.

(10) Patent No.: US 12,015,869 B1
(45) Date of Patent: Jun. 18, 2024

(54) FLAT PANEL DISPLAY (FPD)—LINK III CONVERTER APPARATUS FOR CONVERTING VIDEO SIGNALS FROM A HDMI TO FPD-LINK III VIDEO FORMAT RECEIVED VIA USB INTERFACE

(71) Applicant: N.S. International, Ltd., Troy, MI (US)

(72) Inventors: Karthikeyan Palanisamy, Troy, MI (US); Kumaresan Thiyagarajan, Troy, MI (US); Rajvel Murugesan, Troy, MI (US); Rajadeepan Murugesan, Troy, MI (US); Daniel Sanchez, Troy, MI (US); Slavko Bogoevski, Troy, MI (US); Syed Nabi, Troy, MI (US)

(73) Assignee: N.S. International, Ltd., Tory, MI (US)

( * ) Notice: Subject to any disclaimer, the term of this patent is extended or adjusted under 35 U.S.C. 154(b) by 0 days.

(21) Appl. No.: 18/372,810

(22) Filed: Sep. 26, 2023

(51) Int. Cl.
*H04N 5/268* (2006.01)
(52) U.S. Cl.
CPC .................... *H04N 5/268* (2013.01)
(58) Field of Classification Search
CPC ..................................... H04N 5/268
See application file for complete search history.

(56) References Cited

U.S. PATENT DOCUMENTS

| 9,946,506 | B2* | 4/2018 | Ting ..................... G06F 3/005 |
| 2012/0054389 | A1 | 3/2012 | Lee et al. |
| 2013/0203491 | A1 | 8/2013 | Hurley et al. |
| 2013/0279693 | A1 | 10/2013 | Rothschild et al. |
| 2018/0234637 | A1* | 8/2018 | Marino .................. H04N 5/63 |
| 2021/0107397 | A1 | 4/2021 | Unterweger et al. |
| 2022/0060655 | A1 | 2/2022 | Ohmura et al. |
| 2023/0392858 | A1* | 12/2023 | Bihr ..................... H04N 7/183 |

OTHER PUBLICATIONS

VHDL Design of Serial Communications Circuits Volnei A. Pedroni Federal Technological University of Parana State.*
International Search Report & Written Opinion for PCT/US23/33694 mailed Jan. 26, 2024.

* cited by examiner

*Primary Examiner* — Tammara R Peyton
(74) *Attorney, Agent, or Firm* — Clark Hill PLC

(57) ABSTRACT

An apparatus for converting HDMI to FPD-link III signals in automobiles. The apparatus includes a USB to I2C bridge allowing USB interfaced commands to configure and update a USB to I2C Bridge, I/O Expander, EEPROM and FPD-link III Serializer that convert HDMI inputs to FPD-link III outputs. The apparatus also includes an EEPROM configured to hold video timing configurations for the Device Under Test as well.

13 Claims, 2 Drawing Sheets

FLAT PANEL DISPLAY (FPD)—LINK III CONVERTER APPARATUS FOR CONVERTING VIDEO SIGNALS FROM A HDMI TO FPD-LINK III VIDEO FORMAT RECEIVED VIA USB INTERFACE

FIELD OF THE INVENTION

The present invention generally relates an apparatus and method of converting video signals. More specifically, the present invention relates to converting video signals from HDMI to FPD Link III video format using an interface where instructions are received via a USB interface.

BACKGROUND OF THE INVENTION

Video signal conversion has many benefits in improving accessibility to and testing of video systems, such as in automobiles. FPD Link III format has been used for years for flat panel displays in automobiles for the transmission of high definition video signals. This has become increasingly important as cameras have become more common, and even standard features, on many automobiles. Existing FPD-link III systems convert HDMI signals to FPD-link III outputs only with instructions received via an Ethernet interface. The typical FPD-link III systems also use command line interfaces for interacting with the components of the system.

A shortcoming of existing FPD Link III converters is the inability to receive a USB signal for control of video conversion from HDMI to FPD-link III output.

Another shortcoming of existing FPD-link III converters is the lack of a graphical user interface for modifying programs running on the converter.

Therefore, there exists a heretofore unmet need for a system configured to receive instructions via a USB interface.

SUMMARY OF THE DISCLOSURE

The present invention is an apparatus and method for converting video signals. Specifically, the apparatus converts a HDMI input to an FPD-link III output in an automobile after receiving configuration instructions via a USB interface.

One embodiment of the present disclosure is an FPD-link III converter apparatus that includes: a USB interface; a USB to I2C bridge in communication with the USB interface; an FPD-link III serializer in communication with the USB to I2C bridge, where the FPD-link III serializer has at least one output port; and an HDMI port in communication with the FPD-link III serializer. The apparatus may also include an input/output expander in communication with the USB to I2C bridge and an enabler circuit in communication with the input/output expander and at least output for an enabling signal. The apparatus may also include an EEPROM in communication with both the HDMI port and the USB to I2C bridge. The EEPROM may include instructions for input video timing configuration for a device under test. The apparatus may include a power input; and a power converter, where the power converter transmits electrical power to at least one of the USB to I2C bridge and the FPD-link III serializer.

Another embodiment of the present disclosure includes a system for providing media in FPD-link III format to a device under test, the system including: a processor; a memory in communication with the processor and containing a program that, when executed, configures the processor to provides a graphical user interface; a display in communication with the processor; and an FPD-link III converter apparatus. The FPD-link III converter apparatus may include a USB interface; a USB to I2C bridge in communication with the USB interface; an FPD-link III serializer in communication with the USB to I2C bridge, where the FPD-link III serializer has at least one output port; and an HDMI port in communication with the FPD-link III serializer. The apparatus may also include an input/output expander in communication with the USB to I2C bridge and an enabler circuit in communication with the input/output expander and at least output for an enabling signal. The program on the memory may be configured to modify a program on the input/output expander. The apparatus may also include an EEPROM in communication with both the HDMI port and the USB to I2C bridge. The EEPROM may include instructions for input video timing configuration for the device under test. In some embodiments, the program on the memory is configured to modify a program on the EEPROM. The apparatus may include a power input; and a power converter, where the power converter transmits electrical power to at least one of the USB to I2C bridge and the FPD-link III serializer.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE DISCLOSURE

Figure 1:
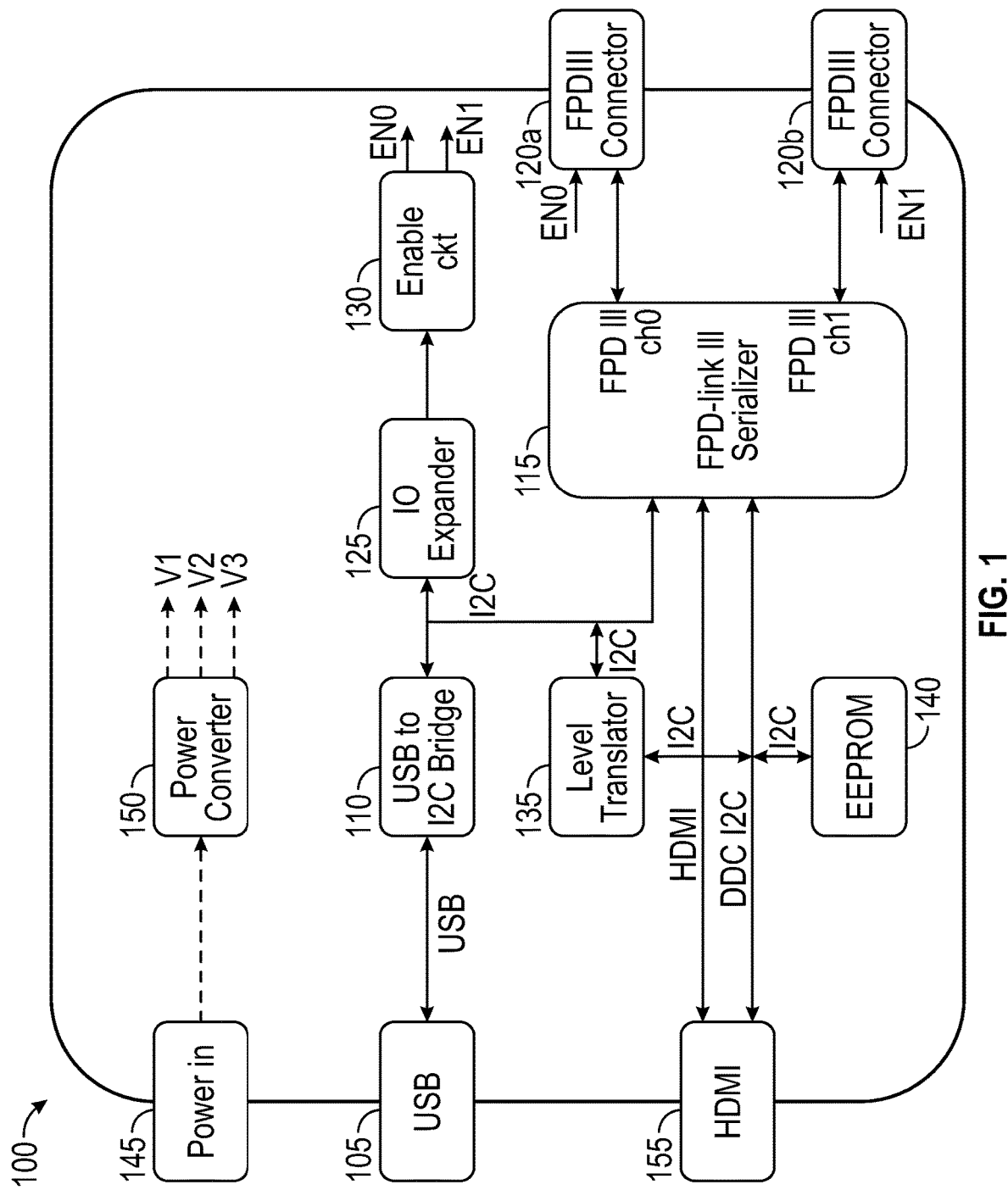
FIG. 1 is a diagram of a video converter apparatus according to one embodiment of the present disclosure.

While this invention may be susceptible to embodiment in different forms, specific embodiments are shown in the drawings and will be described herein in detail with the understanding that the present disclosure is to be considered an exemplification of the principles of the invention and is not intended to limit the invention to that as illustrated.

FIG. 1 shows a diagram for an embodiment of a video converter apparatus 100 includes a USB interface 105 in electrical communication with a USB to I2C Bridge 110. Suitable USB to I2C Bridge circuits must include I2C clock stretching capability. One suitable USB to I2C Bridge is a model FT4222HQ manufactured Future Technology Devices International Limited, headquartered Glasgow, Scotland. The USB to I2C Bridge 110 is connected to an FPD-link III Serializer 115 configured to convert an HDMI signal to an FPD-link III signal. The FPD-link III Serializer 115 may have one or more FPD-link III output ports 120*a*, 120*b*. Any suitable FPD-link III serializer with at least 720p video output resolution may be used, such as a model DS90UB949-Q1 Serializer manufactured by Texas Instruments, Inc. headquartered in Dallas, Texas. In some embodiments, the FPD-link III Serializer 115 may have a video output with at least 1080p resolution. The HDMI signal may come from an HDMI port 155 in communication with the FPD-link III Serializer 115.

The USB to I2C Bridge 110 may also be in electrical communication with an I/O expander 125, which may be connected to an enable circuit 130 configured with one or more enable outputs. The enables outputs may be in communication with enable inputs on the FPD-link III output ports 120a, 120b. The USB to I2C Bridge 110 may also be in communication with a level translator 135 in communication with the FPD-link III Serializer 115 and the HDMI port 155. The level translator 135 may be selected to translate signals between different voltages, such as 3.3 volts and 5 volts, such that different components can operate at different voltages. The apparatus may also include an EEPROM 140 in communication with the HDMI port 155 and the FPD-link III Serializer 115. The EEPROM 140 may include instructions for input video timing configuration and updates to be provided to the FPD-link III Serializer 115. Preprogrammed video parameters on the EEPROM 140 that can be read by an HDMI source 255 (See FIG. 2) which may transmit video through FPD-link III Serializer 115 avoids the step of manually setting up parameters in the FPD-link III Serializer 115 for devices under test. In some embodiments, the EEPROM 140 may include EDID information for devices under test.

The apparatus 100 may also include an input power port 145 in communication with a power converter circuit 150. The power converter circuit 150 may supply power at specific required voltages to other components in the apparatus 100, including the USB to I2C Bridge 110 and the FPD-link III Serializer 115.

Figure 2:
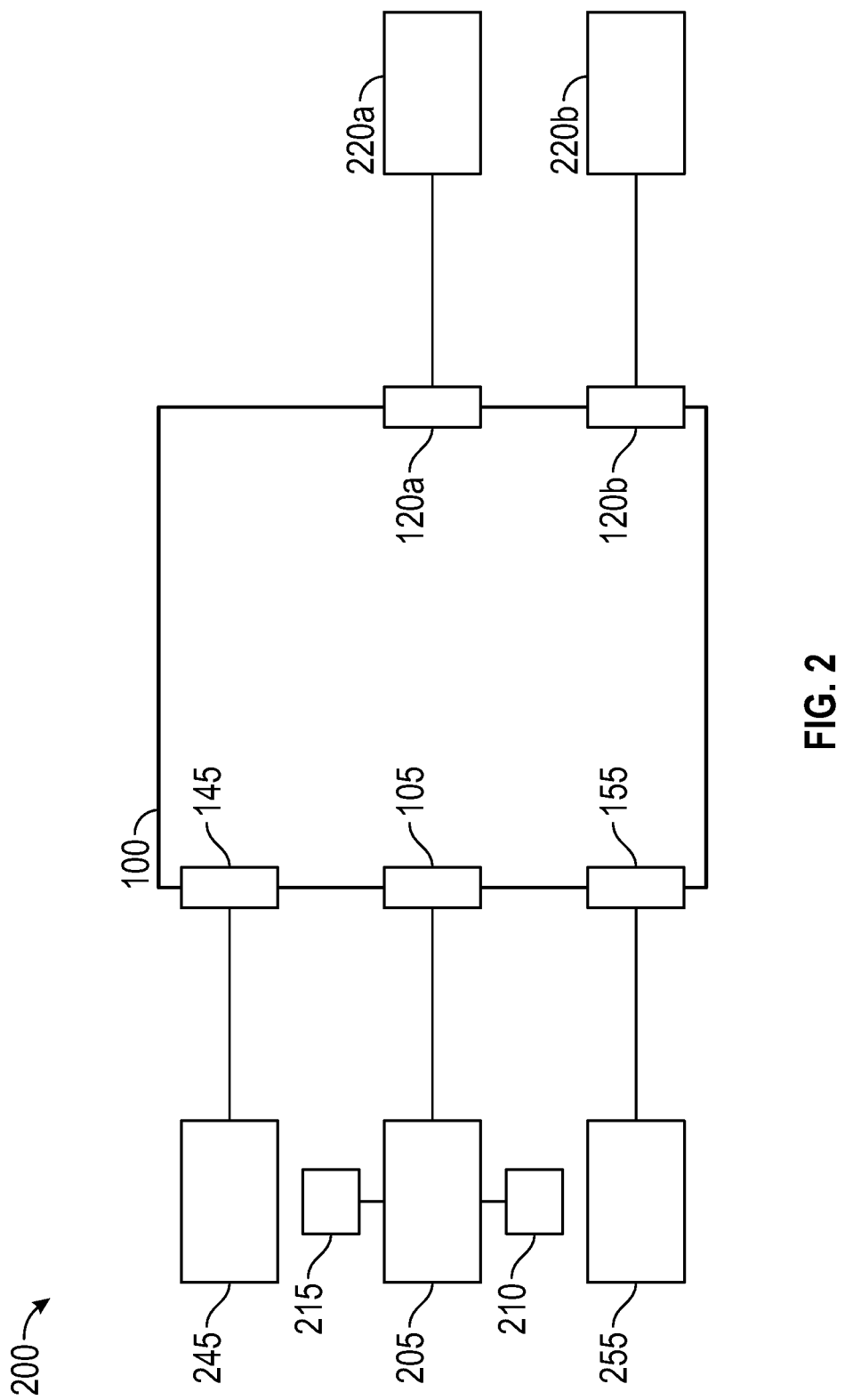
FIG. 2 is a diagram of a system using the video converter apparatus according to one embodiment of the present disclosure.

FIG. 2 is a system 200 using the apparatus 100 according to one embodiment of the present disclosure. The system 200 includes a power source 245, such as a battery or DC power supply, connected to the power input 145. The system 200 also includes a processor 205 with a memory 210 and a display 215 and/or other peripheral devices for operation of the processor 205. The memory 210 may include a program that, when executed, instructs the processor 205 to display a graphical user interface (GUI) to allow a user to operate the processor 205 and transmit commands to add, edit, or delete configurations on one or more of the USB to I2C Bridge 110, the FPD-link III Serializer 115, the IO expander 125, the Enable circuit 130, the level translator 135, and the EEPROM 140. The processor 205 may include a USB communications port and be connect to the USB input 105. The system 200 may include a HDMI source 255 connected to the HDMI port 155. One or more devices under test (DUTs) 220a, 220b may be connected to the FPD-link III output ports 120a, 120b.

In operations, an input from the processor 205 communicated over the USB interface 105 is converted to I2C protocol by the USB to I2C Bridge 110 and transmitted to the FPD-link III Serializer 115, while an HDMI signal and display data channel (DDC) signal are communicated over the HDMI interface 155 to the FPD-link III Serializer 115. The USB signal may include instructions that are communicated through the I/O expander 125 to the enable circuit 130 to enable one or more automotive application devices (Device Under Test 220a, 220b) (See FIG. 2) through specific FPD-link III output ports 120a, 120b that are in communication with outputs on the FPD-link III Serializer 115. In some embodiments, an instruction communicated over the USB interface 105 or stored on the EEPROM 140 may configure or update the FPD-link III Serializer 115. The EEPROM 140 may include video parameters to be read by the HDMI source 255, which transmits video through the FPD-link III Serializer 115 for devices under test 220a, 220b so that resolution parameters do not need to be set up manually. Throughout, the power converter 150 may supply electrical power to the various components of the apparatus 100 at a single or variety of voltages required for their operation.

While embodiments in the present disclosure have been described in some detail, according to the preferred embodiments illustrated above, it is not meant to be limiting to modifications such as would be obvious to those skilled in the art.

The foregoing disclosure and description of the disclosure are illustrative and explanatory thereof, and various changes in the details of the illustrated apparatus and system, and the construction and the method of operation may be made without departing from the spirit of the disclosure.

What is claimed is:

1. A Flat Panel Display (FPD)-link III converter apparatus comprising:
   a USB interface;
   a USB to I2C bridge in communication with the USB interface;
   an FPD-link III serializer in communication with the USB to I2C bridge, where the FPD-link III serializer has at least one output port; and
   an HDMI port in communication with the FPD-link III serializer.

2. The apparatus of claim 1, further comprising:
   an input/output expander in communication with the USB to I2C bridge, and
   an enabler circuit in communication with the input/output expander and at least one output for an enabling signal.

3. The apparatus of claim 1, further comprising:
   an EEPROM in communication with both the HDMI port and the USB to I2C bridge.

4. The apparatus of claim 3, where the EEPROM comprises instructions for input video timing configuration for a device under testing.

5. The apparatus of claim 1, further comprising:
   a power input; and
   a power converter, where the power converter transmits electrical power to at least one of the USB to I2C bridge and the FPD-link III serializer.

6. A system for providing media in FPD-link III format to a device under testing, the system comprising:
   a processor;
   a memory in communication with the processor and containing a program that, when executed, configures the processor to provides a graphical user interface;
   a display in communication with the processor; and
   an FPD-link III converter apparatus comprising:
      a USB interface;
      a USB to I2C bridge in communication with the USB interface; and
      an FPD-link III serializer in communication with the USB to I2C bridge, where the FPD-link III serializer has at least one output port configured to communicate with the device under testing; and
      an HDMI port in communication with the FPD-link III serializer.

7. The system of claim 6, wherein the program on the memory is configured to modify programs on at least one of: the USB to I2C bridge, and the FPD-link III serializer.

8. The system of claim 6, wherein the apparatus further comprises:
   an input/output expander in communication with the USB to I2C bridge, and
   an enabler circuit in communication with the input/output expander and at least one output for an enabling signal.

9. The system of claim 8, wherein the program on the memory is configured to modify a program on the input/output expander.

10. The system of claim 6, wherein the apparatus further comprises:
    an EEPROM in communication with both the HDMI port and the USB to I2C bridge.

11. The apparatus of claim 10, where the EEPROM comprises instructions for input video timing configuration for the device under testing.

12. The apparatus of claim 10, wherein the program on the memory is configured to modify a program on the EEPROM.

13. The system of claim 6, wherein the apparatus further comprises:
    a power input; and
    a power converter, where the power converter transmits electrical power to at least one of the USB to I2C bridge and the FPD-link III serializer.

* * * * *